Sept. 29, 1942.    R. A. BOSSI    2,297,132
BOMB SIGHT FOR AIRPLANES
Filed Feb. 17, 1941    5 Sheets-Sheet 1

Inventor.
Romeo A. Bossi
by Heard Smith & Tennant.
Attys.

Sept. 29, 1942.  R. A. BOSSI  2,297,132
BOMB SIGHT FOR AIRPLANES
Filed Feb. 17, 1941  5 Sheets-Sheet 2

Inventor.
Romeo A. Bossi
by Heard Smith & Tennant.
Attys.

Sept. 29, 1942. R. A. BOSSI 2,297,132
BOMB SIGHT FOR AIRPLANES
Filed Feb. 17, 1941 5 Sheets-Sheet 3
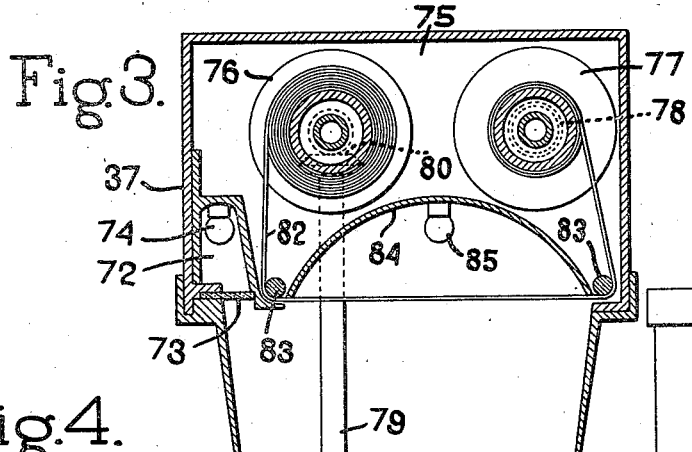
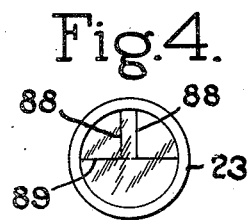
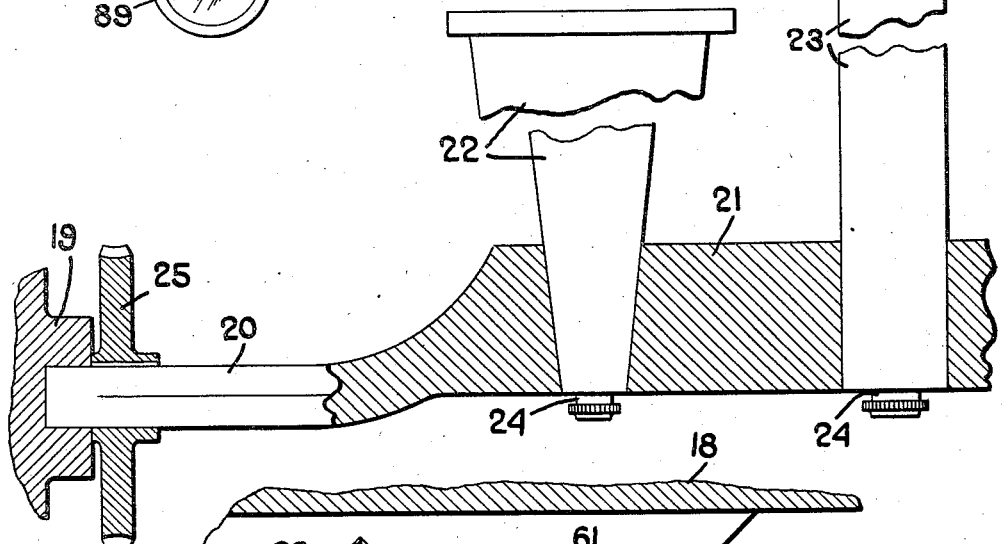
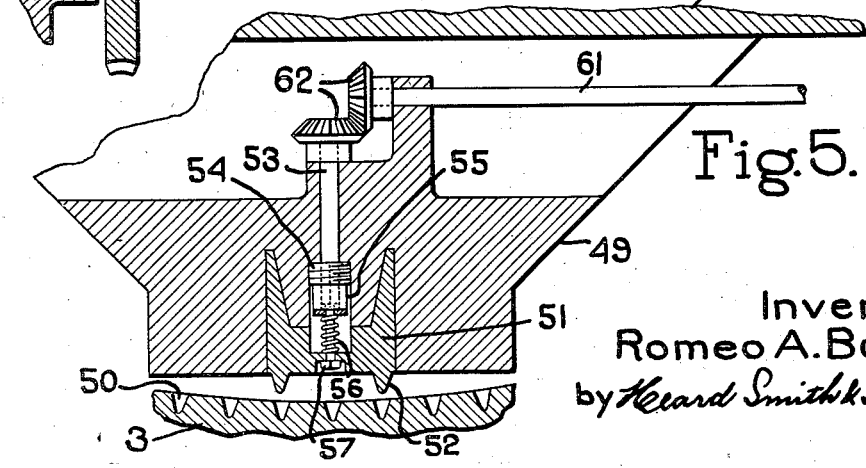
Inventor.
Romeo A. Bossi
by Heard Smith & Tennant.
Attys Sept. 29, 1942.  R. A. BOSSI  2,297,132
BOMB SIGHT FOR AIRPLANES
Filed Feb. 17, 1941  5 Sheets-Sheet 4

Inventor.
Romeo A. Bossi
by Heard Smith & Tennant
Attys.

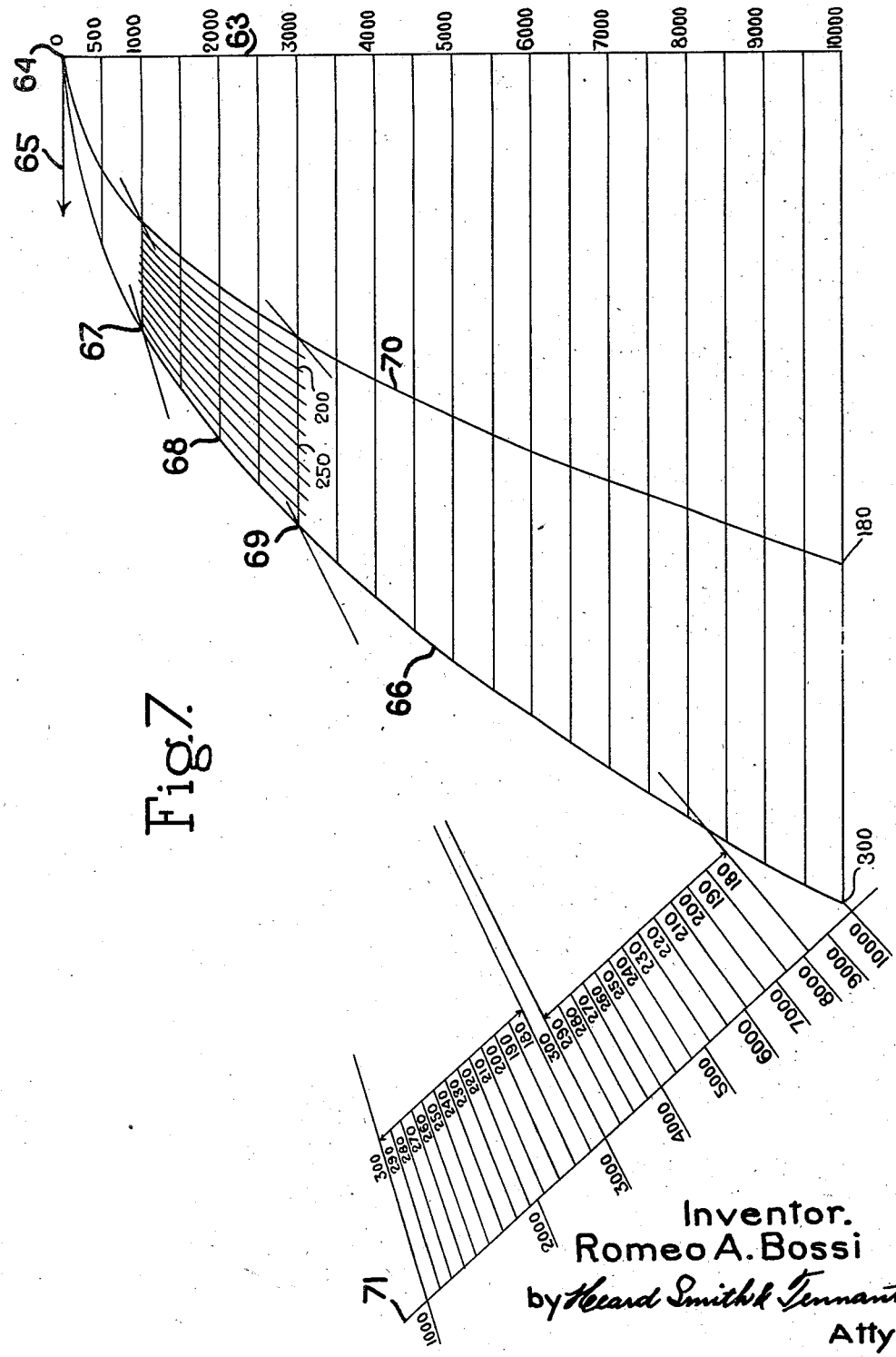

Patented Sept. 29, 1942

2,297,132

UNITED STATES PATENT OFFICE 2,297,132

BOMB SIGHT FOR AIRPLANES

Romeo A. Bossi, Newton Center, Mass.

Application February 17, 1941, Serial No. 379,213

10 Claims. (Cl. 33—46.5)

This invention relates to a bomb sight for an airplane.

The invention has for its object to provide a bomb sight for accurately determining the time for releasing a bomb from an airplane in order to insure the bomb striking the desired object.

The invention has for its further object to provide such a bomb sight which will require the minimum work of the operator leaving him free to concentrate upon watching the object to be struck.

The invention has for its further object to provide such a bomb sight in which the maximum data requisite for determining the actual trajectory of the bomb is pre-calculated and plotted enabling the operator to determine mechanically and simply the time at which to release the bomb in order to strike the object.

These and other objects and features of the invention will appear more fully from the accompanying description and drawings and will be set forth in the claims.

The drawings illustrate a construction embodying a preferred form of the invention together with an illustration of the principle upon which the graduated scale employed is obtained.

Since the invention is not concerned with the construction of the plane itself it is unnecessary here to illustrate anything more than a suitable bracket and base which may be built in or secured to the plane in the proper location for mounting the construction employed in connection with the invention.

The construction or apparatus employed for embodying the invention must be located at a suitable position in the plane which will enable the operator to obtain a clear view of the object to be bombed as the plane approaches the point at which the bomb is to be released.

The term "fore and aft axis" of the plane is employed with reference to an axis extending horizontally in the direction of flight when the plane is flying in a horizontal plane and in a straight path. This axis should coincide with, or be as close as possible to, the axis of rotation of the plane about which it tips or turns laterally when flying under said conditions.

In the drawings:

Fig. 3 is a view chiefly in transverse cross section, but partially broken away, taken through the pivotal axis of the telescopes and the graduated scale and its casing when the telescopes are normal to the scale;

Fig. 4 is a detail of the objective of the sighting telescope;

Fig. 5 is a detail chiefly in vertical cross section illustrating the means for locking the main support to and unlocking it from the plane;

Fig. 7 is a view illustrating the method employed for obtaining the graduated scale.

The invention is based upon the theory that the bombing plane for a short period before and up to the time of the release of the bomb may be flown horizontally at a given or known velocity toward the point to be bombed and at a given or known height thereabove.

The invention employs two telescopes, a reading telescope and a sighting telescope arranged with their sight axes parallel and mounted for common pivotal adjustment on an axis passing through their eye pieces at right angles to the fore and aft axis of the plane. This axis of the telescopes is mounted on a support on which is mounted a graduated scale located opposite the path of the objective of the reading telescopes as it is adjusted on its axis. The bombing operator adjusts the telescopes on their axes so that the hair line of the reading telescope or its sight axis coincides with the proper graduation on the scale for the existing conditions. When the object to be bombed appears on the sight axis of the sighting telescope the bomb is released and, as hereinafter explained, will fall upon the object.

It is essential therefore that as the plane is approaching the point where the bomb is to be released the support for the telescopes and the graduated scale shall be maintained in a vertical position with the pivotal axis of the telescopes horizontal and at right angles to the fore and aft axis of the plane. Since the plane may rock more or less laterally an important feature of the invention resides in so mounting the support that under reasonable conditions, or within limits, it may thus be maintained vertical.

The eye pieces of the two telescopes are arranged as closely together as possible so that the operator may look through them both at the same time or at least may move his head slightly sidewise to view first the one and then the other, and it is desirable therefore that the operator should maintain a fixed position with respect to the telescopes. Another desirable feature of the invention therefore resides in providing means on the support for carrying and positioning the operator with his eyes opposite the eye pieces. For this purpose a seat is provided on the support and thus the operator maintains the same vertical position as do the telescopes.

Figure 1:
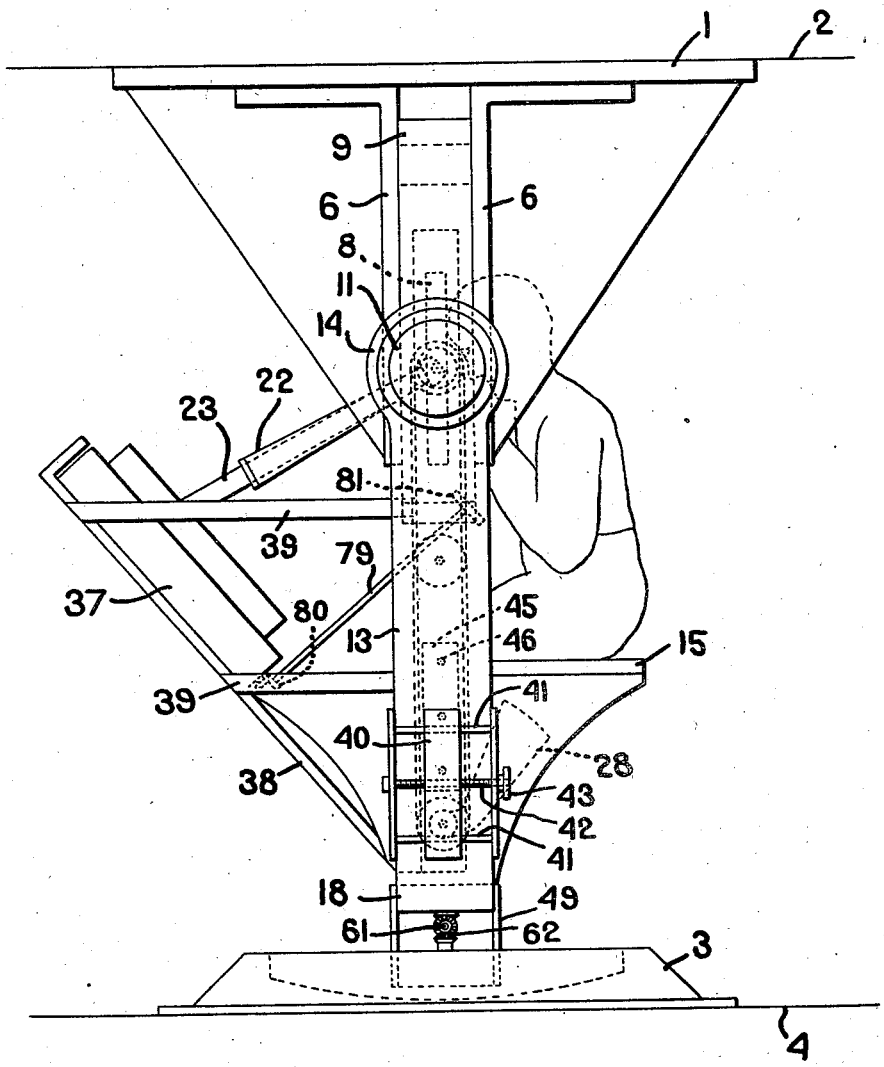
Fig. 1 is a side elevation of a simple and preferred form of construction embodying the invention.
Figure 2:
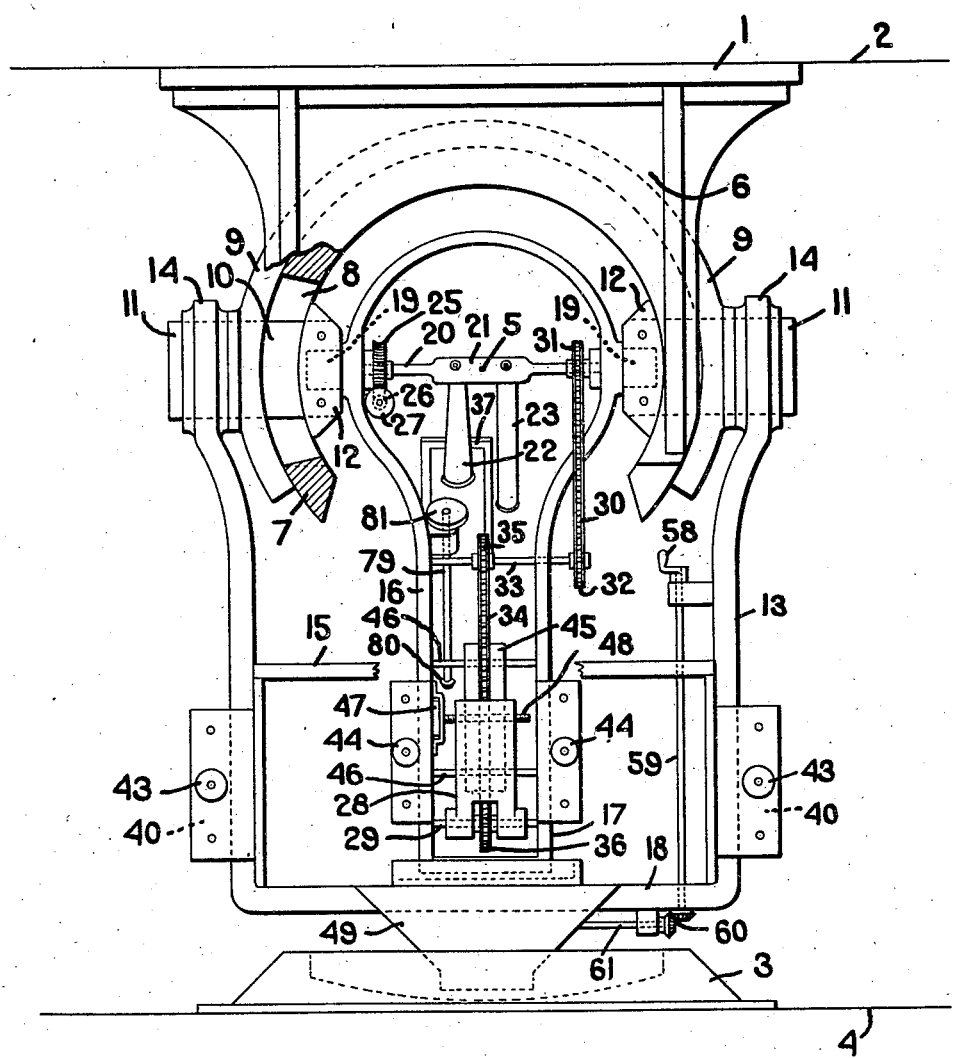
Fig. 2 is a rear elevation, partially broken away, of the construction illustrated in Fig. 1.

In the construction shown in Figs. 1 and 2 a bracket indicated generally at 1 is rigidly secured to an upper surface 2 of the plane and a base 3 is secured therebeneath to a lower surface 4 of the plane. These parts are so mounted that the fore and aft axis of the plane coincides as nearly as possible with a line passing horizontally fore and aft of the plane through the point 5 but the error caused by a separation of the said fore and aft axis and this line within the limits of the structure of the plane is comparatively slight.

The bracket 1 includes a pair of depending parallel plates 6 extending downwardly at right angles to the fore and aft axis of the plane and secured to and between these plates is an annulus 7 having therein slots 8 at opposite sides. The support for the telescopes and the operator comprises an annulus 9 mounted to rotate on the annulus 8 about the center 5 and suitable antifriction means may be employed between the annulus 8 and the annulus 9. At each side a bearing member presents a flat portion 10 extending from the annulus 9 through the slot 8 and presenting at the outer end a trunnion 11 and fastened thereto at the inner end a shoe 12 fitting against the inner surface of the annulus 7. Thus it will be seen that the entire support may rotate transversely about the axis 5 within the limits of the length of the slots 8.

A yoke-shaped member 13 is pivotally supported at its upper ends 14 on the trunnions 11 and upon it is mounted the operator's seat 15. A loop-shaped member 16 is secured at its lower end 17 to the bottom 18 of the yoke 13 and is provided with trunnions 19 journaled in the shoes 12 in axial alinement with the trunnions 11. Thus this loop-shaped member 16 partakes of the same movements as the yoke 13.

A shaft 20, see Fig. 3, is journaled at its ends in, and in axial alinement with, the trunnions 19 and is offset at its central portion 21. In the central portion 21 of this shaft are mounted the reading telescope 22 and the sighting telescope 23 extending radially therefrom with their sight axes in parallel and with their eye pieces 24 so located that the axis of the shaft 20, and consequently the rotary axis of the entire support, passes through these eye pieces.

The shaft 20 at one side has secured thereto a worm wheel 25 cooperating with a worm on a shaft 26 mounted on the looped member 16 and provided with a hand wheel 27 so that by turning the hand wheel 27 the operator may adjust the position of the telescopes.

Since the telescopes are relatively heavy and the central portion of the shaft 20 is offset, it is desirable that these parts should be counterbalanced, and any suitable means may be employed for that purpose. As here illustrated a counterbalancing weight 28 is secured to a shaft 29 journaled in the lower end of the looped member 16. A sprocket chain 30 extends over a sprocket wheel 31 on one end of the shaft 20 and over a sprocket wheel 32 on a shaft 33 journaled in the looped member 16 and a second sprocket chain 34 extends over a sprocket wheel 35 on the shaft 33 and over a sprocket wheel 36 on the shaft 29 and these elements are so arranged that the weight 28 always occupies a position which will counterbalance the weight of the telescopes and shaft 20.

The graduated scale, hereinafter described in detail, is mounted in a casing 37 carried by an arm 38 secured to and rigidly braced at 39 from the supporting structure and so positioned that the graduated scale in the casing stands opposite the path of the objective of the reading telescope as it is adjusted with the shaft 20.

In order that the entire supporting structure may swing on its trunnions and turn on the annulus 7 freely so that it may be maintained in a vertical position, suitable provisions are made for accurately counterbalancing the weight of the support and its load. In the construction illustrated a series of adjustable weights are provided for that purpose. At each side of the yoke 13, for example, are mounted weights 40 sliding on rods 41 and adjusted on these rods by a screw threaded shaft 42 having a hand wheel 43. A similar construction similarly adjusted by hand wheels 44 is provided at each side of the loop-shaped member 16. A weight 45 is also shown mounted to slide laterally on the rods 46 in the loop member 16 and adjusted by the hand wheel 47 and screw threaded shaft 48. It will be understood, however, that suitable counter-adjusting weights may be provided at any desired point.

It is desirable that the entire supporting structure at times, particularly when bombing is not taking place, shall be locked to the plane so that the swinging operation may not take place, and accordingly means are provided for locking and unlocking the support to the plane. For that purpose the lower portion 18 of the yoke member 13 is shown provided with a shoe 49 projecting downward into a spherical cavity in the base 3, see Fig. 5. This cavity is shown studded with recesses 50. A plunger 51 is mounted for vertical movement on the shoe 49 and provided with projections 52 adapted to engage the recesses 50. This plunger is moved vertically by means of a shaft 53 keyed into a nut 54 having a threaded engagement with the shoe. This nut has a reduced lower end portion 55 fitting against a spring 56 on a pin 57 mounted in the plunger 51. Thus it will be seen that as the shaft 53 is rotated in one direction the plunger 51 will be yieldingly pressed down to bring its projections 52 into locking engagement with the recesses 50 and when rotated in the opposite direction the plunger will be withdrawn. The shaft 53 is shown conveniently operated by a crank 58 on a shaft 59 connected by beveled gears 60 to a shaft 61 in turn connected by beveled gears 62 to the shaft 53.

The swinging movement of the support in both directions for the purpose of enabling it to be maintained vertically is shown as limited by the size of the spherical cavity in the base 3 and correspondingly by the length of the slots 8 in the annulus 7, but these limits may be varied within the capacity of the plane construction.

Figure 6:
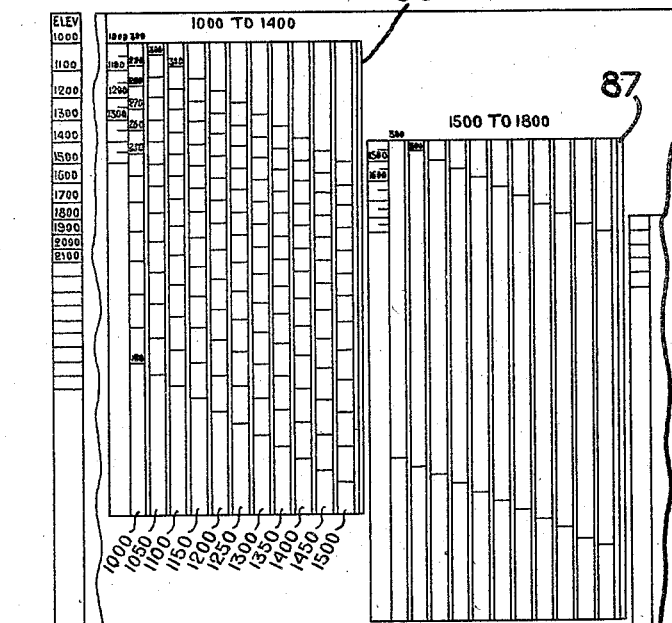
Fig. 6 is an illustrative view, partially broken away, of the graduated scale.

The graduated scale employed and the method of obtaining the graduations therefor are illustrated in Figs. 6 and 7. For purposes of illustration the scale is shown arranged for a given bomb and for a plane velocity of between 180 and 300 miles per hour and flying at a range of heights between 1000 and 10,000 feet above the object or point on the ground to be bombed. It will, of course, be understood that in referring to the object or point on the ground and the elevation, the elevation is the vertical distance above this point and it is assumed that this elevation is known, that is that when the plane is flying horizontally toward the object or the point on the ground the elevation of the plane thereabove is known. It is also assumed that the velocity of the plane during a short period while approaching the time of release of the bomb is maintained constant at a known figure, and further that this velocity is the absolute velocity of the plane with respect to the ground, suitable corrections being made to obtain this absolute velocity so that when the bomb is released from the plane its trajectory will be that resulting from this velocity. Such a trajectory is capable of being plotted and is on the order of a parabola. Consequently while a limited range of velocities and elevations are herein illustrated it will be understood that the plotting may be made for any required ranges of velocity and elevation.

In Fig. 7 the vertical line 63 represents elevations in feet as indicated measured from the zero point 64 which is assumed to be the axis of the shaft 20 passing through the eye pieces of the telescopes and located on the path 65 of the direction of travel of the airplane. It is true, of course, that the bomb will not be released at exactly the same level as the eye pieces and may be released on a path a few feet away. This slight variation will probably make little difference but may be allowed for if found necessary in plotting. The line 66 is now plotted to represent the trajectory of the given bomb when released at the point 64 with the plane flying at 300 miles per hour. It will thus be seen that if the trajectory is properly pre-calculated and plotted the bomb will land on the point 67 if the plane is 1000 feet above the ground or the object, on the point 68 if it is 2000 feet above, on the point 69 if it is 3000 feet above, and so on. On the same principle an entire series of trajectories are calculated and plotted for the same bomb with the plane flying at different speeds. It is unnecessary to illustrate all of these trajectories but there is shown for further illustration a second trajectory 70 calculated for a speed or velocity of 180 miles per hour and sections of the trajectories calculated for speeds or velocities between 180 and 300 miles per hour increasing in steps of ten miles per hour. It will be understood, however, that any number of such trajectories may be pre-calculated and plotted according to the range of plane speeds or velocities likely to be employed.

The line 71 is plotted on the diagram at the same angle to the vertical as the face of the scale in the casing 37 of the apparatus makes with respect to the vertical. If now a straight line be drawn from the zero point 64 through the intersection of any given trajectory with any horizontal line indicating elevation to the line 71 and the line 71 represents a scale, a graduation will thus be formed. If the reading telescope be directed to this graduation so that its sight axis coincides therewith the said sight axis if prolonged will be directed to a point on the ground at the given elevation intersected by the given trajectory when the plane is flying horizontally toward said point on the ground at the given velocity and at the given elevation thereabove and the bomb is released at the point 64. It will thus be seen that if a scale occupying the position or relation 71 in the diagram is positioned in the casing 37 so that it bears the same relation to the vertical and to the axis of the shaft 20 as it bears to the point 64, and the reading telescope is set upon the graduation, that the time for release of the bomb will occur when the corresponding point on the ground appears on the sight axis of the sighting telescope with the plane flying at the given velocity at the given elevation toward the said point on the ground.

The scale represented by the line 71 may, therefore, be graduated throughout to indicate the positions at which the reading telescope should be set for given elevations and given speeds, but even with the limited number of trajectories and elevations indicated this would make a confusing number of graduations on a single line such as 71 and therefore provision is made for a scale having movable sections, thus enabling an indefinite number of graduations to be formed.

In Fig. 7 on the line 71 there is shown plotted the graduations for various elevations when the speed or velocity of the plane is 300 miles per hour, thus the line marked 1000 is formed by a line passing from the zero point 64 through the point 67 where the trajectory 66 for 300 miles per hour intersects the elevation line 1000. In a similar manner the graduations down to 10,000 are formed. In other words, these graduations are formed by the intersections of the scale line 71 by chords having a common origin at the zero point 64 and subtending the plotted trajectory.

The means employed for forming a graduated scale with a practically unlimited number of graduations corresponding to given velocities and elevations and a mechanism for operating this graduated scale is illustrated in Figs. 3 and 6. The casing 37, already referred to, is a box-like structure with its face opposite the path of the objective of the reading telescope as the telescope is adjusted on its axis. At the left hand side there is shown formed in the casing a narrow chamber 72 having at the face a translucent strip 73 lighted by a suitable lamp 74. In the main chamber 75 of the casing are mounted in parallelism two flanged spools 76 and 77. A spring 78 tends to wind up the spool 77. A shaft 79 connected by beveled gears 80 with the spool 76 extends rearward into a convenient position and is provided with an operating hand wheel 81. A strip 82, of translucent paper, or other suitable material, wound on the two spools extends over idler rolls 83 across the front of the casing and at its exposed portion has behind it a partition 84 supporting a lamp 85.

The graduated scale is formed on the strip 73 and on the strip 82, these strips being illustrated in detail in Fig. 6. The length of the strip 73 and the width of the strip 82 is made as large as convenient or as the available space will permit because the larger this is the finer may be made the graduations, while the length of the strip 82 will, as will be apparent, depend upon the width.

The strip 73 is employed as a fixed standard and the graduations thereon represent the points to be sighted by the reading telescope at the maximum velocity and the desired range of elevations. It is here assumed, for convenience, that the maximum velocity is 300 miles per hour and the range of elevations from 1000 to 10,000 feet. Accordingly the graduations on this part of the scale are formed by plotting, as previously described in connection with the line 71, that is by prolonging the cords of the trajectory 66 for 300 miles per hour, subtending the various sections from the zero elevation to the required elevations.

To obtain further graduations of the scale the strip 82 is plotted with a series of sections extending longitudinally thereof, the sections covering successive ranges of elevation and each for a given range of velocities. The range of velocities and of elevations, and the fineness of the graduations, in each of these sections, will, of course, depend upon the particular requirements and the space available. As illustrated each section as shown contains the graduations for a range of 400 feet elevation graduated for each 50 feet and at each elevation within the range graduated for velocities between 180 and 300 miles per hour graduated for each ten miles per hour.

Taking, for example, the section indicated generally at 86 which covers the elevations from 1000 to 1400 feet, the first column contains a few graduations corresponding to those on the strip 73. The second column is graduated for an elevation of 1000 feet for velocities from 300 to 180 miles per hour; the third column for elevations of 1050 feet graduated for velocities of from 300 to 180 miles per hour, and so on. Thus it will be seen that the graduations on this section are spread out over a wide space, whereas if they were all crowded together on the strip 73 it would be impossible to read them. The second section 87 is formed in the same way for a range of elevations from 1500 to 1800 feet. The first column contains a few graduations corresponding to those on the strip 73. The second column is graduated for an elevation of 1400 feet for velocities from 300 to 180 miles per hour; the third column for elevations of 1450 feet graduated for velocities of from 300 to 180 miles per hour, and so on. The second and third columns are repetitions of the last two columns in the first section and while strictly unnecessary are desirable in shifting from one section to the other. The sections thus continue in sequence lengthwise of the strip 82. In Fig. 6 the strip is shown broken away and the final section covering the range of elevations from 9700 to 10,000 feet is indicated.

It will thus be apparent that the operator by turning the shaft 79 may bring any section of the graduated scale opposite the line of sight of the reading telescope which has within its field of vision both the strip 73 and the exposed portion of the strip 82. Thus the operator knowing his approximate elevation brings the required section of the scale strip into view and checks its alinement with the graduations of the fixed strip 73. The flanged spools 76 and 77, the strip 82, and the guiding devices are all carefully and accurately constructed so that as the strip is wound back and forth the graduations on the first column of each section are maintained in accurate alinement with the corresponding graduations on the fixed strip 73.

The telescopes are, of course, provided with the usual hair lines, and in addition the sighting telscope 23 is provided with a pair of vertical hair lines 88, see Fig. 4.

In view of the foregoing description the operation of the bomb sight is apparent. The graduated scale is carefully plotted and mounted in the casing 37 at the required angle to the vertical and in the required relation to the pivotal axis of the telescopes. The operator carefully arranges the counterbalances so that the supporting structure normally hangs vertical. The necessary levels are, of course, employed and are not illustrated. The bomb operator is informed of the elevation above the object to be bombed at which the plane will be flying when the bomb is released and also of the net or absolute velocity at which the plane will be flying. He then sets the reading telescope upon the proper graduation on the scale shifting by means of the hand wheel 81 the strip 82 to bring the proper section within the field of vision. If any change in elevation or velocity takes place the operator upon being informed may readily re-set the reading telescope. As the plane approaches the object the operator will see it through the sighting telescope between the hair lines 88 and when, as the plane continues its flight, the object appears upon the horizontal hair line 89 the operator releases the bomb.

The strips 73 and 82 are removable and consequently the trajectories corresponding to a series of different conditions may be pre-calculated and plotted to present a corresponding series of graduated scales any one of which may be employed. A pointer may also be set opposite the vertical column on the section of the graduated scale for the given velocity to assist the operator in setting the reading telescope on the proper graduation.

The trajectories will, of course, be plotted with optimum accuracy in accordance with the assumed conditions and the best scientific and observational data available. It will be recognized that the preferred embodiment of the invention illustrated and described somewhat in detail is an exemplification of certain broad principles among which the following may be noted. It will be seen that the scale and the reading telescope are spaced or separated from the sighting telescope and that the amount of this separation and the position of the scale and reading telescope are determined by the particular connections employed for operating the sighting telescope. It will also be seen that the reading telescope functions broadly as an indicator and that when any graduation on the scale and this indicator are in alignment the corresponding position of the sighting telescope is determined. It will be seen also that while in the illustrated embodiment the scale is fixed and the reading telescope or indicator moves this is an example of relative movement taking place between the indicator and the scale, and that this relative movement acts through connections to the sighting telescope in the position determined by the alignment of the indicator and the selected graduation on the scale.

Having thus described the invention, what is claimed as new, and desired to be secured by Letters Patent, is:

1. A bomb sight for an airplane comprising a reading telescope and a sighting telescope, arranged with their sight axes parallel and connected for common pivotal adjustment on an axis intersecting their sight axes at right angles to the fore and aft axis of the plane, a support for said pivotal axis mounted on the plane, a graduated scale mounted on the support opposite the path of the objective of the reading telescope, the graduations on the scale severally coinciding with the axis of the reading telescope directed to points on the ground intersected by the pre-calculated trajectories of a given bomb if released from the plane flying horizontally at a given velocity toward the point and at a given height thereabove, whereby, when the plane is flying with its fore and aft axis and said pivotal axis horizontal and with the reading telescope adjusted in alinement with the proper graduation and the flight of the plane continues under the same conditions, release of the bomb is determined by the point on the ground appearing on the axis of the sighting telescope.

2. A bomb sight for an airplane comprising the construction and operation defined in claim 1, in which the said pivotal axis passes through the eye pieces of both telescopes, together with means for mounting the support on the plane acting automatically within limits to maintain the support vertical with the said pivotal axis horizontal and at right angles to the fore and aft axis of the plane, and means on the support for carrying and positioning the operator with his eyes opposite the eye pieces of the telescopes.

3. A bomb sight for an airplane comprising a support mounted on the plane, a shaft rotarily adjustably mounted in the support with its axis at right angles to the fore and aft axis of the plane, a reading telescope and a sighting telescope secured to and projecting radially from said shaft with their sight axes parallel, a graduated scale mounted on the support opposite the path of the objective of the reading telescope, the graduations on the scale severally coinciding with the axis of the reading telescope directed to points on the ground intersected by the pre-calculated trajectories of a given bomb if released from the plane flying horizontally at a given velocity toward the point and at a given height thereabove, whereby, when the plane is flying with its fore and aft axis and said pivotal axis horizontal and with the reading telescope adjusted in alinement with the proper graduation and the flight of the plane continues under the same conditions, release of the bomb is determined by the point on the ground appearing on the axis of the sighting telescope.

4. A bomb sight for an airplane comprising the construction and operation defined in claim 3, together with means on the support connected with said shaft acting to counterbalance the telescopes with respect to the axis of the shaft.

5. A bomb sight for an airplane comprising a reading telescope and a sighting telescope, arranged with their sight axes parallel and connected for common pivotal adjustment on an axis intersecting their sight axes at right angles to the fore and aft axis of the plane, a support for said pivotal axis mounted on the plane, a graduated scale supported opposite the path of the reading telescope, the graduations of which are formed by the intersections of the scale by chords having a common origin at the pivotal axis of the reading telescope and subtending the plotted trajectories of a given bomb released from a plane flying horizontally at given velocities and at given heights above the point on the ground intersected by the trajectory, whereby, when the plane is flying with its fore and aft axis and said pivotal axis horizontal and with the reading telescope adjusted in alinement with the proper graduation and the flight of the plane continues under the same conditions, release of the bomb is determined by the point on the ground appearing on the axis of the sighting telescope.

6. A bomb sight for an airplane comprising the construction and operation defined in claim 1 together with means for mounting the support on the plane to swing on the said pivotal axis passing through the sight axes of the telescopes and on an axis extending fore and aft of the plane, and means on the support for counterbalancing any weight thereof tending to divert the support from the vertical.

7. A bomb sight for an airplane comprising the construction and operation defined in claim 1 in which the said pivotal axis passes through the eye pieces of both telescopes together with means on the support for carrying and positioning the operator with his eyes opposite the eye pieces of the telescopes, means for mounting the support on the plane to swing on the said axis passing through the eye pieces on the telescopes and on an axis extending fore and aft of the plane, and means on the support for counterbalancing any weight thereof or thereon tending to divert the support from the vertical.

8. A bomb sight for an airplane comprising a scale extending transversely of the airplane and graduated to indicate the points at which a bomb should be released to strike an object on the ground, a reading telescope and a sighting telescope connected to swing in unison on an axis extending parallel to the face of the scale transversely of the airplane and intersecting at right angles the sight axes of said telescopes with the field of sight of the reading telescope opposite the scale and with the field of sight of the sighting telescope extending past the scale, the axis of the reading telescope when intersecting a given graduation on the scale acting to position the sight telescope so that when its axis intersects an object on the ground corresponding to said graduation a bomb released will strike the object under the given conditions.

9. A bomb sight for an airplane comprising a scale extending transversely of the airplane having a plurality of longitudinally stepped and transversely spaced sections each presenting a series of parallel longitudinal columns transversely graduated, a fixed longitudinal gauge at one side of the scale by means of which the graduations of each section are positioned longitudinally when the scale is moved transversely to bring the section adjacent the gauge, means for moving the scale transversely with respect to the gauge and the airplane, a scale reading telescope and a sighting telescope on the airplane connected to swing in unison on an axis extending parallel to the transverse graduations and intersecting at right angles the sight axes of said telescopes with the field of the reading telescope opposite the section adjacent the gauge and with the field of sight of the sighting telescope extending past the scale.

10. A bomb sight for an airplane comprising a graduated scale mounted on the plane, each graduation of which indicates a point at which a bomb should be released to strike an object on the ground when the plane is flying horizontally at a given velocity toward the point and at a given height thereabove, a reading indicator mounted on the plane in co-operative relation to the scale and movable relatively to the scale to align with any graduation thereof, a sighting telescope spaced from the reading indicator and scale and mounted to swing on an axis extending transversely on the plane and intersecting at right angles the sight axis of the telescope, and connections to the sighting telescope operated by the relative movement between the scale and reading indicator, acting when the indicator is in alignment with a given graduation on the scale to position the sighting telescope so that when its axis intersects an object on the ground corresponding to said graduation a bomb released under the given conditions will strike the object.

ROMEO A. BOSSI.